United States Patent
Fujioka et al.

(10) Patent No.: US 12,240,438 B2
(45) Date of Patent: Mar. 4, 2025

(54) CONTACTOR FAILURE DETERMINATION APPARATUS FOR VEHICLE

(71) Applicant: Mazda Motor Corporation, Hiroshima (JP)

(72) Inventors: Shinya Fujioka, Aki-gun (JP); Haruki Yamane, Aki-gun (JP); Junya Kono, Aki-gun (JP); Yuki Ida, Aki-gun (JP); Yuta Otsuka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 258 days.

(21) Appl. No.: 17/945,282

(22) Filed: Sep. 15, 2022

(65) Prior Publication Data
US 2023/0116289 A1    Apr. 13, 2023

(30) Foreign Application Priority Data
Oct. 1, 2021  (JP) .................. 2021-162918

(51) Int. Cl.
*B60W 10/26* (2006.01)
*B60K 6/28* (2007.10)

(52) U.S. Cl.
CPC ............... *B60W 10/26* (2013.01); *B60K 6/28* (2013.01); *B60W 2710/244* (2013.01)

(58) Field of Classification Search
CPC ... B60W 10/26; B60W 2710/244; B60K 6/28; B60L 2240/527; B60L 3/04; B60L 2250/10; B60L 53/14; B60L 3/00; Y02T 10/70; Y02T 10/7072; Y02T 90/14; H01H 47/002
See application file for complete search history.

(56) References Cited

U.S. PATENT DOCUMENTS

2005/0269981 A1* 12/2005 Sakurai ................. B60W 10/08
                                                        318/139
2006/0021098 A1    1/2006 Tezuka
2019/0210481 A1*  7/2019 Ishida ..................... B60L 53/62

FOREIGN PATENT DOCUMENTS

JP            4572168 B2    10/2010

OTHER PUBLICATIONS

European Patent Office, Extended European Search Report Issued in EP Application No. 22193379.9, Feb. 13, 2023, Munich, 10 pages.

* cited by examiner

*Primary Examiner* — Alan D Hutchinson
(74) *Attorney, Agent, or Firm* — Alleman Hall & Tuttle LLP

(57) ABSTRACT

To provide a contactor failure determination apparatus capable of appropriately determining failure of a contactor provided in a vehicle, a voltage sensor capable of detecting rising or dropping of a voltage of a second circuit including an external charger is provided. When an external charging request is made, a first control for closing each external charging contactor is executed, a second control for closing a pre-charge contactor is executed after execution of the first control, a third control for closing a second main contactor is executed after execution of the second control, and response to the voltage sensor detecting that the voltage of the second circuit has not risen after execution of the third control, it is determined that at least one of the external charging contactors has failed in an open state.

16 Claims, 10 Drawing Sheets

FIG. 8
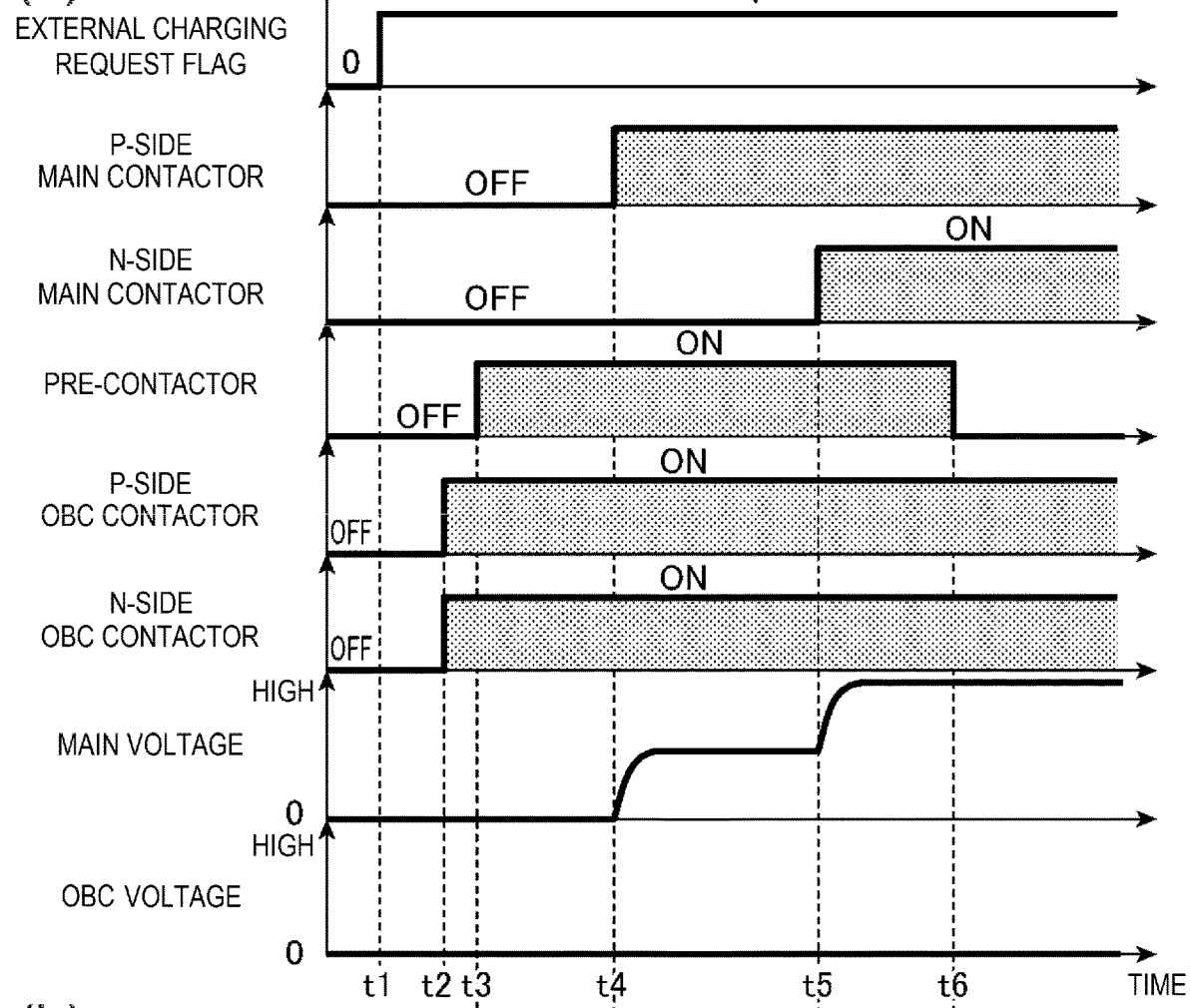
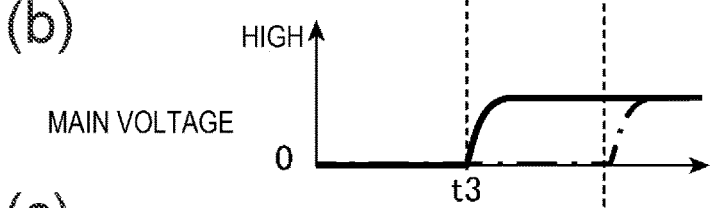
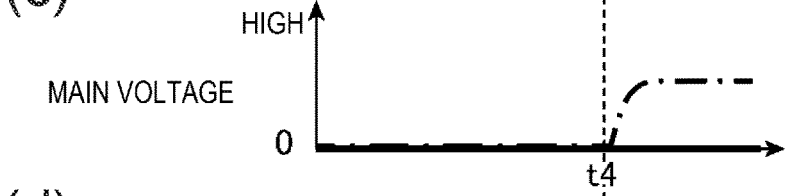
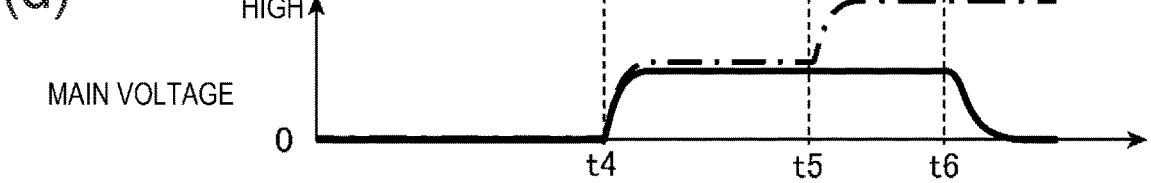

CONTACTOR FAILURE DETERMINATION APPARATUS FOR VEHICLE

TECHNICAL FIELD

The present disclosure relates to a contactor failure determination apparatus that is mounted to a vehicle including a plurality of contactors.

BACKGROUND ART

Conventionally, an inverter and a motor are mounted to a vehicle so as to supply electric power from a battery to the motor via the inverter, and a connection/disconnection device is provided between the battery and a circuit having the inverter and the motor to make/interrupt electrical connection therebetween.

For example, in JP4572168B2, a battery (a DC power supply in JP4572168B2) and a load circuit are connected in an electrically connectable/disconnectable manner by a plurality of relays. More specifically, in an apparatus disclosed in JP4572168B2, a first main relay is disposed between a positive electrode terminal of the battery and the load circuit, a second main relay is disposed between a negative electrode terminal of the battery and the load circuit, and a pre-charge relay and an electrical resistor are disposed in parallel with the second main relay. When the apparatus that makes/interrupts the electrical connection between the battery and the circuit is provided therebetween, just as described, unnecessary exchange of the electric power between the battery and the circuit can be prevented by controlling such an apparatus.

However, when the apparatus fails, the electrical connection between the battery and the circuit is no longer appropriately made/interrupted. For this reason, it has been requested that the failure of the apparatus can be diagnosed. To answer such a request, the apparatus disclosed in JP4572168B2 is configured as follows. The first main relay is opened in a state where the second main relay is closed and the pre-charge relay is opened during a stop of the vehicle. Then, failure of the first main relay is determined on the basis of a voltage generated to the load circuit at this time. Thereafter, the pre-charge relay is closed while the second main relay is opened. Then, failure of the second main relay is determined on the basis of the voltage generated to the load circuit at this time.

SUMMARY OF THE INVENTION

Problem to be Solved by the Invention

Here, there is a case where a device capable of charging the battery from an external power supply, that is, an external charger for supplying output power of the power supply to the battery by connecting the external power supply and the battery is mounted to the vehicle, to which the motor is mounted as a drive source or the like. In this case, it is desired to adopt such a configuration that a contactor is provided to allow/interrupt electrical connection between the external charger and a circuit connected thereto in order to prevent an unnecessary power exchange between the external charger and another electrical device or the battery, and it is also desired to appropriately determine failure of the contactor.

The present disclosure has been made in view of circumstances as described above and therefore has a purpose of providing a contactor failure determination apparatus for a vehicle capable of appropriately determining failure of a contactor provided to the vehicle.

Means for Solving the Problem

To solve the above problem, the inventors of the present disclosure have examined connecting an external charger to a circuit, which is connected to a battery, via a contactor (an external charging contactor), to open the external charging contactor and a contactor, which connects or disconnects the battery and the circuit, when a request to start external charging for charging the battery by an external power supply is made, and determining a failure of the external charging contactor on the basis of a change in a voltage on the external charger side that occurs at this time. However, it is understood that, when a contactor on the battery side and the external charging contactor are closed at the same time, a relatively loud noise is generated due to the closing of multiple contactors at the same time. The inventors of the present disclosure have also examined a configuration to close the external charging contactor after the contactor on the battery side is closed. However, it is understood that, in this configuration, a high in-rush current is possibly introduced into the external charger side from the battery via the circuit. Based on the above findings, the inventors of the present disclosure have invented the following as a contactor failure determination apparatus capable of appropriately determining failure of the contactors.

In order to solve the problem, the present disclosure provides a contactor failure determination apparatus mounted to a vehicle including a battery that includes a positive electrode terminal and a negative electrode terminal, a first circuit that includes an inverter and a motor; a first main contactor that makes or interrupts electrical connection between the first circuit and one of the positive electrode terminal and the negative electrode terminal, a second main contactor that makes or interrupts electrical connection between the first circuit and the other of the positive electrode terminal and the negative electrode terminal, and a pre-charge contactor that is disposed in parallel with the first main contactor and makes or interrupts the electrical connection between the first circuit and the one terminal. The contactor failure determination apparatus includes a second circuit that includes an external charger configured to supply electric power from an external power supply to the battery so as to charge the battery, a pair of external charging contactors that make or interrupt electrical connection between negative-electrode sides of the first circuit and the second circuit and between positive-electrode sides of the first circuit and the second circuit, a voltage sensor configured to detect rising or dropping of a voltage of the second circuit, and a controller that executes an external charging preparation control for opening the first main contactor, the second main contactor, the pre-charge contactor, and each of the external charging contactors after a stop of the vehicle, and in response to a request to start external charging for charging the battery by the external power supply being made, bringing the contactors into a state where each of the main contactors and each of the external charging contactors are closed and the pre-charge contactor is opened before a start of power supply from the external power supply to the external charger. Electrical resistance between the terminal and the first circuit via the pre-charge contactor is set to be higher than electrical resistance between the terminal and the first circuit via the first main contactor. When executing the external charging preparation control, the controller executes a first control for closing each of the external charging contactors, executes a second control for closing the pre-charge contactor after execution of the first control, executes a third control for closing the second main contactor after execution of the second control, and in response to the voltage sensor detecting that the voltage of the second circuit has not risen after execution of the third control, determines that at least one of the external charging contactors has failed in an open state.

In this configuration, during execution of the external charging preparation control, that is, in a period from time at which the request to start the external charging is made to time at which the power supply to the external charger is started, the first, second, and third controls are executed, and each of the external charging contactors, the pre-charge contactor, and the second main contactor are closed in this order. Therefore, it is possible to avoid all of the contactors being closed at the same time while each of the external charging contactors and the second main contactor are closed, and it is thus possible to prevent an occupant from receiving a sense of discomfort due to generation of a relatively loud noise that is associated with the closing of multiple contactors at the same time.

In addition, in this apparatus, the one terminal of the battery and the first circuit are electrically connected via the pre-charge contactor with the high electrical resistance, and thereafter the other terminal of the battery and the first circuit are electrically connected via the second main contactor. Therefore, it is possible to prevent a high in-rush current from flowing from the battery to the first circuit and the second circuit when the battery and the first circuit are electrically connected, and thus to prevent failure of electrical devices provided in the first circuit and the external charger.

Furthermore, in this configuration, since the failure of the external charging contactor is determined on the basis of rising or dropping of the voltage of the second circuit after execution of the third control, the failure of the external charging contactor can appropriately be determined.

More specifically, as long as each of the external charging contactors is normal, the second circuit and the first circuit are electrically connected by executing the first control. Thus, as long as each of the external charging contactors is normal, the battery and the first circuit are electrically connected by executing the subsequent second control and third control, and the voltage of the second circuit rises. On the other hand, in the case where at least one of the external charging contactors fails in the open state, the electrical connection between the second circuit and the first circuit is interrupted. Thus, even when the second control and the third control are executed, a voltage of the first circuit does not rise. In this configuration, by using the above, in the case where the voltage of the second circuit has not risen after execution of the third control, it is determined that at least one of the external charging contactors has failed in the closed state. Therefore, it is possible to appropriately determine the failure of the external charging contactor.

In this configuration, preferably, during execution of the first control, the controller closes both of the external charging contactors at the same time.

With this configuration, it is possible to reduce a time required to close the two external charging contactors and thus a time related to a failure determination while avoiding generation of a loud noise associated with closing of the four contactors that are the two external charging contactors, the pre-charge contactor, and the second main contactor at the same time.

In this configuration, preferably, a second voltage sensor configured to detect rising or dropping of a voltage of the first circuit is provided, and in response to the second voltage sensor detecting that the voltage of the first circuit has risen after execution of the second control, the controller determines that the second main contactor has failed in a closed state.

As long as the second main contactor is normally opened, the battery and the first circuit are electrically interrupted even when the second control is executed to close the pre-charge contactor. On the other hand, in the case where the second main contactor fails in the closed state, the voltage of the first circuit rises when the battery and the first circuit are electrically connected due to execution of the second control. In this configuration, by using the above, in the case where the voltage of the first circuit has risen after execution of the second control, it is determined that the second main contactor has failed in the closed state. Therefore, in addition to the external charging contactors, it is possible to appropriately determine whether the second main contactor has failed.

In this configuration, preferably, in response to the second voltage sensor detecting that the voltage of the first circuit has not risen after execution of the third control, the controller determines that at least one of the pre-charge contactor and the second main contactor has failed in an open state.

As long as both of the pre-charge contactor and the second main contactor are normal, the battery and the first circuit are electrically connected and the voltage of the first circuit rises when the second and third control are executed to close both of the pre-charge contactor and the second main contactor. On the other hand, in the case where at least one of the pre-charge contactor and the second main contactor fails in the open state, the battery and the first circuit are maintained in an electrically interrupted state even after execution of the third control, and the voltage of the first circuit does not rise. In this configuration, by using the above, in the case where the voltage of the first circuit has not risen after execution of the third control, it is determined that at least one of the pre-charge contactor and the second main contactor has failed in the open state. Therefore, it is possible to appropriately determine the failure of these contactors.

In this configuration, preferably, when executing the external charging preparation control, the controller executes a fourth control for closing the first main contactor after execution of the third control, executes a fifth control for opening the pre-charge contactor after execution of the fourth control, and in response to the second voltage sensor detecting that the voltage of the first circuit has dropped after execution of the fifth control, determines that the first main contactor has failed in an open state.

When the first main contactor is normal, the battery and the first circuit are electrically connected via the first main contactor by executing the fourth control. Thus, the voltage of the first circuit does not drop even when the pre-charge contactor is opened due to execution of the fifth control. On the other hand, in the case where the first main contactor fails in the open state, the electrical connection between the battery and the first circuit is interrupted by opening the pre-charge contactor due to execution of the fifth control. As a result, the voltage of the first circuit drops. In this configuration, by using the above, in the case where the voltage of the first circuit has dropped after execution of the fifth control, it is determined that the first main contactor has failed in the open state. Therefore, it is possible to appropriately determine the failure of the first main contactor.

In this configuration, preferably, a time from execution of the second control to execution of the third control is set to be shorter than a time from execution of the third control to execution of the fourth control.

In this configuration, preferably, the time from execution of the third control to execution of the fourth control is set to be longer than a time from execution of the fourth control to execution of the fifth control.

In this configuration, preferably, the time from execution of the fourth control to execution of the fifth control is set to be longer than the time from execution of the first control to execution of the second control.

With the time settings as described above, it is possible to further appropriately determine the failure of the contactors.

In the above configuration, preferably, a third voltage sensor configured to detect a voltage difference between the first circuit and the second circuit is provided, and in response to the third voltage sensor detecting that the voltage of the second circuit is lower than the voltage of the first circuit by a specified determination value or more after the start of the external charging, the controller determines that at least one of the external charging contactors has failed in the open state.

By executing the external charging preparation control, the contactors after the start of the external charging are in the state where the main contactors and the external charging contactors are closed and the pre-charge contactor is opened. In this way, when each of the external charging contactors is normal, the voltage of the first circuit is the same as the voltage of the second circuit. On the other hand, in the case where at least one of the external charging contactors fails in the open state, the voltage of the second circuit is lower than the voltage of the first circuit. In this configuration, by using the above, in the case where the voltage of the second circuit is lower than the voltage of the first circuit by the specified determination value or more after the start of the external charging, it is determined that at least one of the external charging contactors has failed in the open state. Therefore, it is possible to appropriately determine the failure of the external charging contactor.

In this configuration, preferably, after the external charging is terminated, the controller executes a sixth control for opening the first main contactor, and in response to the second voltage sensor detecting that the voltage of the first circuit has not dropped after execution of the sixth control, determines that at least one of the first main contactor and the pre-charge contactor has failed in a closed state.

In this configuration, by executing the sixth control, the first main contactor is opened from the state where the main contactors and the external charging contactors are closed and the pre-charge contactor is opened. Therefore, as long as the first main contactor and the pre-charge contactor are normal, the voltage of the first circuit drops when the first circuit and the battery are electrically interrupted. On the other hand, in the case where at least one of the first main contactor and the pre-charge contactor fails in the closed state, the first circuit and the battery are maintained in an electrically connected state, and thus the voltage of the first circuit does not drop. In this configuration, by using the above, in the case where the voltage of the first circuit has not dropped after execution of the sixth control, it is determined that at least one of the first main contactor and the pre-charge contactor has failed in the closed state. Therefore, it is possible to appropriately determine the failure of these.

In this configuration, preferably, the external charger has an AC/DC converter that converts an AC current to a DC current, converts the AC current of an external AC power supply to the DC current, and supplies the DC current to the battery.

In this configuration, preferably, the time from execution of the first control to execution of the second control is set to be shorter than the time from execution of the second control to execution of the third control.

With the time settings as described above, it is possible to further appropriately determine the failure of the contactors.

Advantage of the Invention

As it has been described so far, the contactor failure determination apparatus can appropriately determine the failure of the contactors provided in the vehicle.

BRIEF DESCRIPTION OF THE DRAWINGS

FIG. 8 includes graphs illustrating time changes in parameters at the time when the external charging request is made, in which (a) is a graph in the case where contactors are normal, (b) is a graph of a main voltage in the case where a P-side main contactor is fixed to be ON, (c) is a graph of the main voltage in the case where at least one of the P-side main contactor and a pre-contactor is fixed to be OFF, and (d) is a graph in the case where an N-side main contactor is fixed to be OFF.

FIG. 9 includes graphs illustrating the time changes in the parameters at the time when the external charging request is made, in which (a) is a graph in the case where the contactors are normal, and (b) is a graph of an on-board charging (OBC) voltage in the case where at least one of the OBC contactors are fixed to be ON.

MODES FOR CARRYING OUT THE INVENTION (1) Overall Configuration of Vehicle

Figure 1:
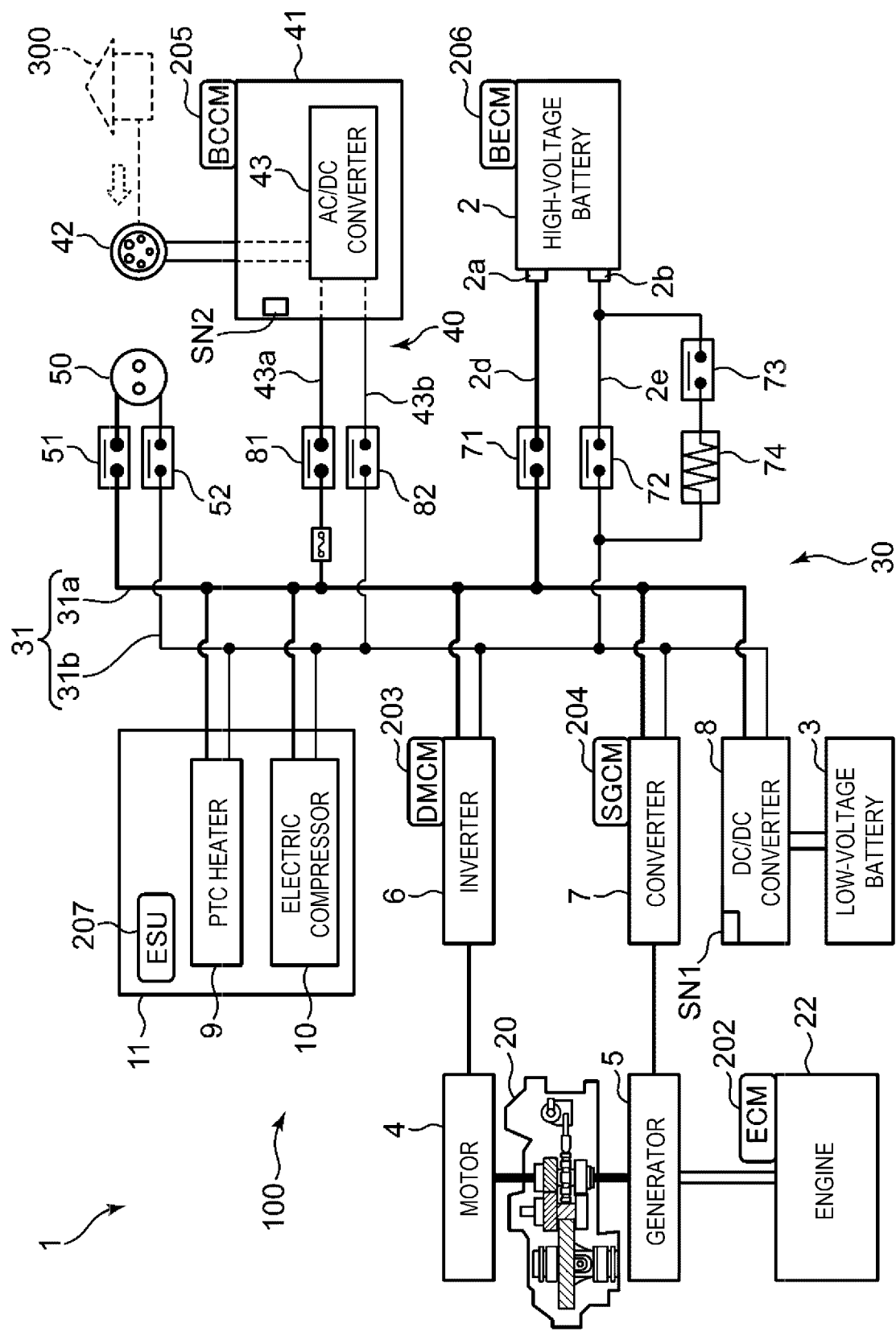
FIG. 1 is a view schematically illustrating a configuration of a vehicle to which a contactor failure determination apparatus according to an embodiment of the present invention is mounted.

A description will be made on a contactor failure determination apparatus according to an embodiment of the present disclosure. FIG. 1 is a view schematically illustrating a configuration of a vehicle 1 to which a contactor failure determination apparatus 100 according to this embodiment is mounted. The vehicle 1 is a four-wheeled automobile, for example.

The vehicle 1 (the contactor failure determination apparatus 100) has a high-voltage battery 2, a low-voltage battery 3, an output voltage of which is lower than the high-voltage battery 2, a high-voltage circuit 30 that has a plurality of electrical devices and is electrically connected to the high-voltage battery 2, an on-board charging (OBC) circuit 40 that is electrically connected to the high-voltage circuit 30, and a plurality of contactors. The vehicle also has a plurality of controllers, each of which includes a microprocessor and the like and controls a respective part of the vehicle 1. The high-voltage battery 2 is an example of a "battery" in the present disclosure, the high-voltage circuit 30 is an example of "first circuit" in the present disclosure, and the OBC circuit 40 is an example of a "second circuit" in the present disclosure.

(Battery)

The high-voltage battery 2 has a pair of terminals (a positive electrode terminal 2a and a negative electrode terminal 2b). In this embodiment, a Li battery (a lithium battery) is mounted as the high-voltage battery 2 to the vehicle 1. For example, the high-voltage battery 2 is configured to have a plurality of battery modules, each of which includes 12 battery cells, and which are connected in series. Six of the battery cells are connected in series in each set, and two sets of these six battery cells are connected in parallel. In addition, in this embodiment, a lead battery is mounted as the low-voltage battery 3 to the vehicle 1. For example, a nominal voltage of the high-voltage battery 2 is 24 V, and a nominal voltage of the low-voltage battery 3 is 12 V.

(High-Voltage Circuit)

The high-voltage circuit 30 includes, as the electrical devices, a motor 4, a generator 5, an inverter 6, a converter 7, a DC/DC converter 8, a positive temperature coefficient (PTC) heater 9, an electric compressor 10, and the like. The high-voltage circuit 30 also has a P-side high-voltage line 31a that is a line on a positive electrode side connected to the positive electrode terminal 2a of the high-voltage battery 2 and an N-side high-voltage line 31b that is a line on a negative electrode side connected to the negative electrode terminal 2b of the high-voltage battery 2. Hereinafter, the P-side high-voltage line 31a and the N-side high-voltage line 31b will appropriately and collectively be referred to as a high-voltage line 31.

The inverter 6, the converter 7, the DC/DC converter 8, the PTC heater 9, and the electric compressor 10 are each connected to the high-voltage line 31. The motor 4 is connected to the high-voltage line 31 via the inverter 6. The generator 5 is connected to the high-voltage line 31 via the converter 7.

The motor 4 rotates when being supplied with electric power from the high-voltage battery 2. The motor 4 is mounted as a drive source of the vehicle 1 to the vehicle 1, and output of the motor 4 is transmitted to wheels (not illustrated) via a drive power transmission apparatus 20.

The generator 5 is a generating unit for charging the high-voltage battery 2. The vehicle 1 in this embodiment is a series-type hybrid vehicle. That is, an engine 22 that drives the generator 5 is mounted to the vehicle 1, the generator 5 generates the electric power when being rotationally driven by the engine 22, and the electric power generated by the generator 5 is supplied to the high-voltage battery 2. The engine 22 is a rotary engine, for example. The generator 5 is also connected to the wheels via the drive power transmission apparatus 20, and the vehicle 1 can regenerate energy during deceleration.

The inverter 6 is a device that converts a DC current to an AC current, converts the DC current from the high-voltage battery 2 to the AC current, and supplies the AC current to the motor 4. The converter 7 is a device that converts the AC current to the DC current, converts the AC current, which is generated by the generator 5, to the DC current, and supplies the DC current to the high-voltage battery 2.

The DC/DC converter 8 is a device that steps down input power for output, steps down an output voltage of the high-voltage battery 2, and supplies the step-down voltage to the low-voltage battery 3. The DC/DC converter 8 is provided with a main voltage sensor SN1 capable of detecting a voltage of the electric power that is input to the DC/DC converter 8 via the high-voltage line 31, that is, a voltage of the high-voltage circuit 30. The main voltage sensor SN1 is an example of a "second voltage sensor" in the disclosure.

The PTC heater 9 and the electric compressor 10 constitute an air conditioner 11 for the vehicle 1. More specifically, the PTC heater 9 is a device for heating inside of a cabin in the vehicle 1, and the electric compressor 10 is a device for cooling the inside of the cabin in the vehicle 1. In this embodiment, a cooling plate (not illustrated) for cooling the high-voltage battery 2 is provided, and the electric compressor 10 also cools this cooling plate.

(OBC Circuit)

The OBC circuit 40 is provided with an on-board charger (OBC) 41, an AC charging inlet 42, and the like. The OBC circuit 40 also has a P-side OBC line 43a that is a line on the positive electrode side connected to the P-side high-voltage line 31a and an N-side OBC line 43b that is a line on the negative electrode side connected to the N-side high-voltage line 31b.

The OBC 41 is a device for supplying electric power from an external power supply 300 to the high-voltage battery 2 so as to charge the high-voltage battery 2. In this embodiment, the OBC 41 receives the electric power from the external AC power supply 300 to charge the high-voltage battery 2. For this reason, the OBC 41 has an AC/DC converter 43 that is a device for converting the AC current to the DC current. The AC charging inlet 42 is a device for electrically connecting the OBC 41 and a cable connected to the external AC power supply 300. The AC charging inlet 42 is configured to be electrically connected to the OBC 41 and is configured that a connector (hereinafter appropriately referred to as an AC charging connector) provided at an end of the cable is inserted therein and fitted thereto. The OBC 41 is provided with an OBC voltage sensor SN2 capable of detecting a voltage of the OBC circuit 40. The OBC 41 is an example of an "external charger" in the present disclosure, and the OBC voltage sensor SN2 is an example of a "voltage sensor" in the present disclosure. In addition, in this embodiment, the main voltage sensor SN1 and the OBC voltage sensor SN2 each function as a "third voltage sensor" in the present disclosure.

In this embodiment, electric power from an external DC power supply can also be used to charge the high-voltage battery 2. More specifically, the vehicle 1 is provided with a DC charging inlet 50 that is connected to the high-voltage circuit 30 via contactors 51, 52. The DC charging inlet 50 is fitted to a connector of a cable that is connected to the external DC power supply, and electrically connects the external DC power supply and the high-voltage circuit 30.

(Controller)

Figure 2:
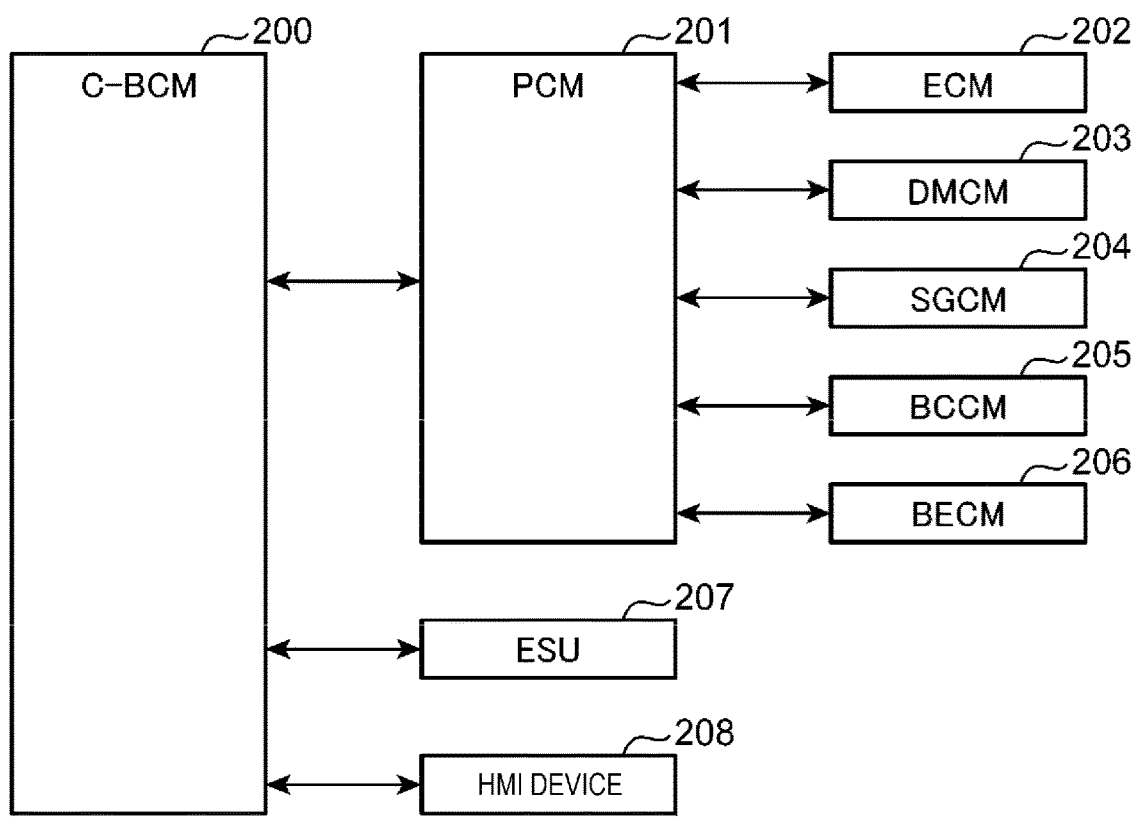
FIG. 2 is a block diagram illustrating relationships among controllers.

FIG. 2 is a block diagram illustrating relationships among the various controllers mounted to the vehicle 1. The controllers include a center-body control module (C-BCM) 200, a power control module (PCM) 201, an engine control module (ECM) 202, a driver motor control module (DMCM) 203, a starter generator control module (SGCM) 204, a battery charger control module (BCCM) 205, a battery energy control module (BECM) 206, an electric supply unit (ESU) 207 are mounted. These controllers 200 to 207 are connected to the low-voltage battery 3, and are actuated when receiving the electric power from the low-voltage battery 3.

Each of the controllers 200 to 207 primarily executes the following control. The C-BCM 200 controls a door, a window, and the like. The PCM 201 controls devices in a drive system of the vehicle 1. The ECM 202 controls the engine 22. The DMCM 203 controls the inverter 6. The SGCM 204 controls the converter 7. The BCCM 205 controls the OBC 41. The BECM 206 controls the high-voltage battery 2. The ESU 207 controls the air conditioner 11. These controllers 200 to 207 mutually exchange signals. For example, these controllers 200 to 206 make controller area network (CAN) communication.

Here, a human-machine interface (HMI) device 208 illustrated in FIG. 2 is a device that shows various types of information, and the like, and includes a display and the like.

(Contactors)

The vehicle 1 is provided with, as the contactors, a pair of main contactors 71, 72 (a P-side main contactor 71 and an N-side main contactor 72), a pre-charge contactor 73, and a pair of OBC contactors 81, 82 (a P-side OBC contactor 81 and an N-side OBC contactor 82). The contactor is an electromagnetic switch that includes an electromagnet, and makes/interrupts electrical connection between two contact points according to the supplied electric power. When the contactor is closed, the two contact points are electrically connected and brought into an energized state. When the contactor is opened, the two contact points are electrically interrupted.

(Main Contactors)

The P-side main contactor 71 makes/interrupts electrical connection between the positive electrode terminal 2a of the high-voltage battery 2 and the high-voltage circuit 30. More specifically, two contact points of the P-side main contactor 71 are respectively connected to the positive electrode terminal 2a (in detail, a positive electrode side battery line 2d that is connected to the positive electrode terminal 2a) of the high-voltage battery 2 and the P-side high-voltage line 31a. The P-side main contactor 71 makes/interrupts the electrical connection between the positive electrode terminal 2a of the high-voltage battery 2 and the P-side high-voltage line 31a.

The N-side main contactor 72 connects/disconnects the negative electrode terminal 2b of the high-voltage battery 2 to/from the high-voltage circuit 30. More specifically, two contact points of the N-side main contactor 72 are respectively connected to the negative electrode terminal 2b (in detail, a negative electrode side battery line 2e that is connected to the negative electrode terminal 2b) of the high-voltage battery 2 and the N-side high-voltage line 31b. The N-side main contactor 72 makes/interrupts electrical connection between the negative electrode terminal 2b of the high-voltage battery 2 and the N-side high-voltage line 31b.

The pre-charge contactor 73 is disposed in a parallel state with one of the main contactors 71, 72, and connects/disconnects one of the terminals 2a, 2b of the high-voltage battery 2 and/from the high-voltage circuit 30. More specifically, two contact points of the pre-charge contactor 73 are respectively connected to one of the terminals 2a, 2b of the high-voltage battery 2 and the high-voltage line 31 corresponding thereto. These are connected/disconnected by the pre-charge contactor 73 in addition to the main contactor. However, electrical resistance between one of the terminals 2a, 2b of the high-voltage battery 2 and the high-voltage line 31 via the pre-charge contactor 73 is greater than electrical resistance between one of the terminals 2a, 2b of the high-voltage battery 2 and the high-voltage line 31 via the main contactor that is arranged in parallel with the pre-charge contactor 73. Accordingly, in a state where both of the pre-charge contactor 73 and the main contactor, which is arranged in parallel therewith, are closed, electricity flows through the line on the main contactor side with the lower electrical resistance than the line on the pre-charge contactor 73 side.

In this embodiment, the pre-charge contactor 73 is provided between the negative electrode terminal 2b of the high-voltage battery 2 and the N-side high-voltage line 31b, and makes/interrupts the electrical connection therebetween. In addition, an electrical resistor 74 is provided between the pre-charge contactor 73 and the N-side high-voltage line 31b. Hereinafter, the pre-charge contactor 73 will appropriately be referred to as a pre-contactor 73.

In this embodiment, the pre-contactor 73 is provided to connect/disconnect the negative electrode terminal 2b to/from the N-side high-voltage line 31b. In conjunction therewith, the N-side main contactor 72, which is disposed in parallel with the pre-contactor 73 is an example of a "first main contactor" in the present disclosure, and the P-side main contactor 71 is an example of a "second main contactor" in the present disclosure.

(OBC Contactors)

The P-side OBC contactor 81 and the N-side OBC contactor 82 each make/interrupt electrical connection between the high-voltage circuit 30 and the OBC circuit 40.

More specifically, two contact points of the P-side OBC contactor 81 are respectively connected to the P-side OBC line 43a and the P-side high-voltage line 31a. The P-side OBC contactor 81 makes/interrupts electrical connection between the P-side OBC line 43a and the P-side high-voltage line 31a. The two contact points of the N-side OBC contactor 82 are respectively connected to the N-side OBC line 43b and the N-side high-voltage line 31b. The N-side OBC contactor 82 makes/interrupts electrical connection between the N-side OBC line 43b and the N-side high-voltage line 31b.

The P-side OBC contactor 81 and the N-side OBC contactor 82 are each an example of an "external charging contactor" in the present disclosure.

(Control Configuration of Contactors)

Figure 3:
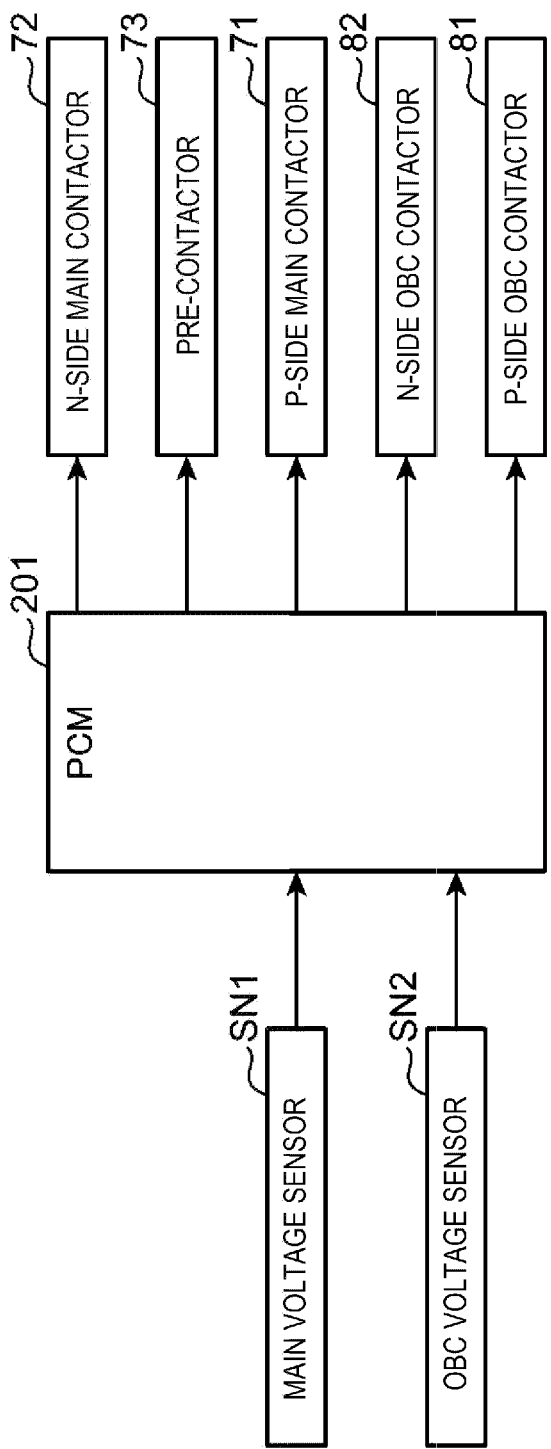
FIG. 3 is a block diagram illustrating a control system related to a contactor failure determination.

FIG. 3 is a block diagram illustrating a control configuration related to the contactors. Each of the contactors is primarily controlled by the PCM 201. More specifically, the PCM 201 is supplied with the electric power from the low-voltage battery 3. The PCM 201 opens/closes each of the contactors by switching between a supply and a stop of the electric power from the low-voltage battery 3 to the respective contactor. The PCM 201 is an example of a "controller" in the present disclosure.

The PCM 201 receives detection information from the various sensors and operation signals of various switches. More specifically, the PCM 201 receives detection signals of the main voltage sensor SN1 and the OBC voltage sensor SN2. Hereinafter, the voltage of the high-voltage circuit 30, which is detected by the main voltage sensor SN1, will appropriately be referred to as a main voltage, and the voltage of the OBC circuit 40, which is detected by the OBC voltage sensor SN2, will appropriately be referred to as an OBC voltage.

The PCM 201 receives a signal from the AC charging inlet 42. More specifically, the PCM 201 receives the signal from the AC charging inlet 42 via the BCCM 205. The AC charging inlet 42 is configured to output a specified signal (hereinafter, appropriately referred to as an AC connector fitting signal) to the BCCM 205 when the AC connector is fitted to the AC charging inlet 42 and the AC charging inlet 42 is brought into a state enabling external charging that is based on the external AC power supply 300. When receiving this AC connector fitting signal from the AC charging inlet 42, the BCCM 205 sends this signal to the PCM 201.

When receiving the AC connector fitting signal, the PCM 201 determines that an external charging request is made. The external charging request is a request to start the external charging (a start request of the external charging). When determining that the external charging request is made, the PCM 201 executes an external charging preparation control. In the external charging preparation control, before the external charging is started (before the electric power supply from the external AC power supply 300 to the OBC circuit 40 and the OBC 41 is started), the contactors are brought into a state where the main contactors 71, 72 and the OBC contactors 81, 82 are closed and the pre-contactor 73 is opened. In this embodiment, when each of the contactors is brought into the above state due to execution of the external charging preparation control, a specified signal (hereinafter appropriately referred to as a power signal) is sent from the PCM 201 to the external AC power supply 300. Then, when receiving this power signal, the AC power supply 300 starts supplying the electric power to the OBC circuit 40 side.

When the external charging preparation control is executed, the OBC circuit 40, the high-voltage circuit 30, and the high-voltage battery 2 are electrically connected. These are connected with low electrical resistance. In this way, when the power supply from the external AC power supply 300 is started later, the electric power is efficiently supplied to the high-voltage battery 2.

Here, the external charging is performed during a stop of the vehicle. Then, when the vehicle 1 is stopped (that is, after the stop of the vehicle), the PCM 201 brings each of the contactors 71, 72, 73, 81, 82 into a closed state. In this way, when the external charging request is made, each of these contactors 71, 72, 73, 81, 82 is in the closed state, and the external charging preparation control is started in this state.

When the AC connector fitting signal is no longer output due to detachment of the AC connector from the AC charging inlet 42, the PCM 201 determines that an external charging stop request as a request to stop the external charging is made. In addition, when the high-voltage battery 2 is fully charged, and when an external charging time, which is set in advance, elapses, the PCM 201 determines that the external charging stop request is made.

When the external charging stop request is made, the PCM 201 brings each of the contactors 71, 72, 73, 81, 82 into an open state. The external charging (the power output from the external power supply 300 to the vehicle side) is terminated when the AC connector is detached from the AC charging inlet 42 or when the external power supply 300 receives a specified signal from the PCM 201. For example, when the high-voltage battery 2 is fully charged, or when the external charging time, which is set in advance, elapses, the PCM 201 sends the above signal to the power supply 300. Accordingly, the external charging is terminated almost at the same time as the PCM 201 determining that the external charging stop request is made.

(Contactor Failure Determination)

Next, a description will be made on a failure determination of each of the contactors 71, 72, 73, 81, 82 executed by the PCM 201. The PCM 201 executes the contactor failure determination during execution of the external charging preparation control, that is, when the external charging request is made (hereinafter appropriately referred to as an external charging request time), and when the external charging is terminated.

Figure 4:
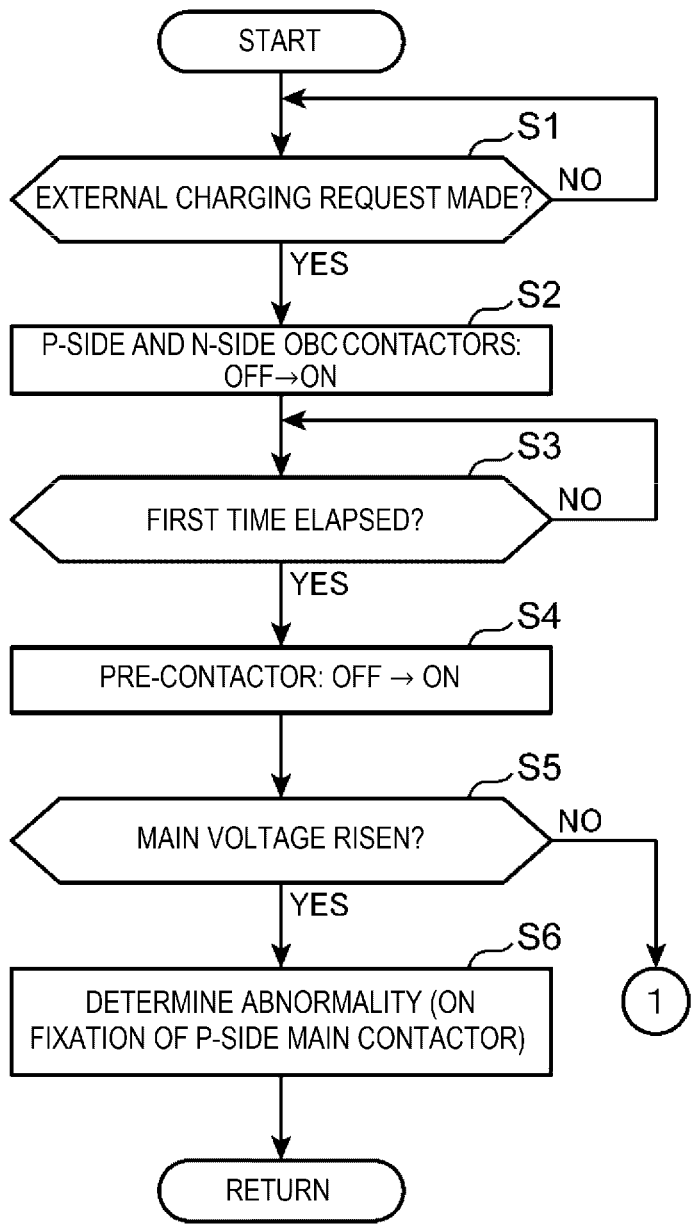
FIG. 4 is a flowchart illustrating a part of a procedure for the contactor failure determination that is executed when an external charging request is made.
Figure 5:
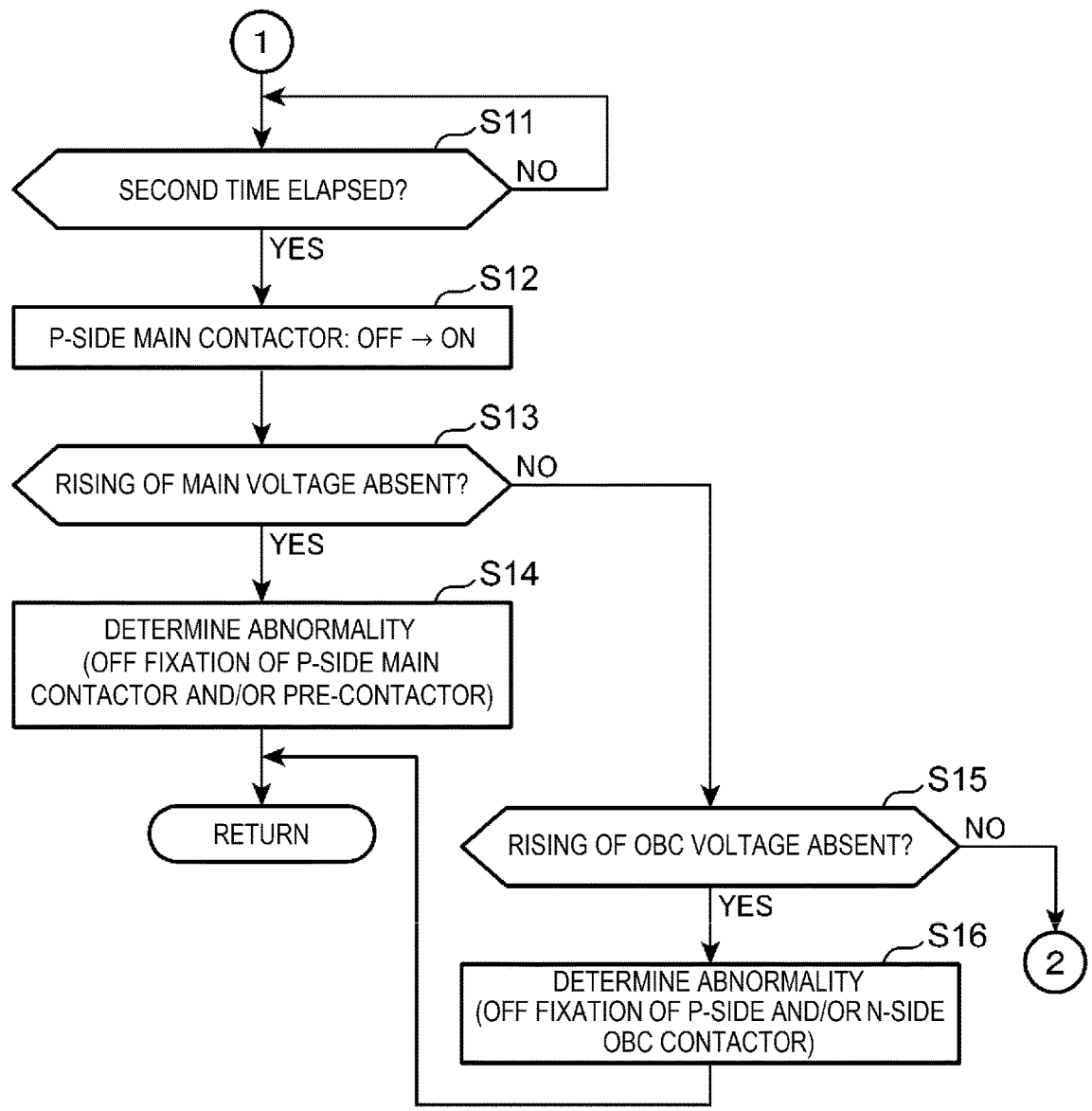
FIG. 5 is a flowchart illustrating a subsequent part of the procedure illustrated in FIG. 4.
Figure 6:
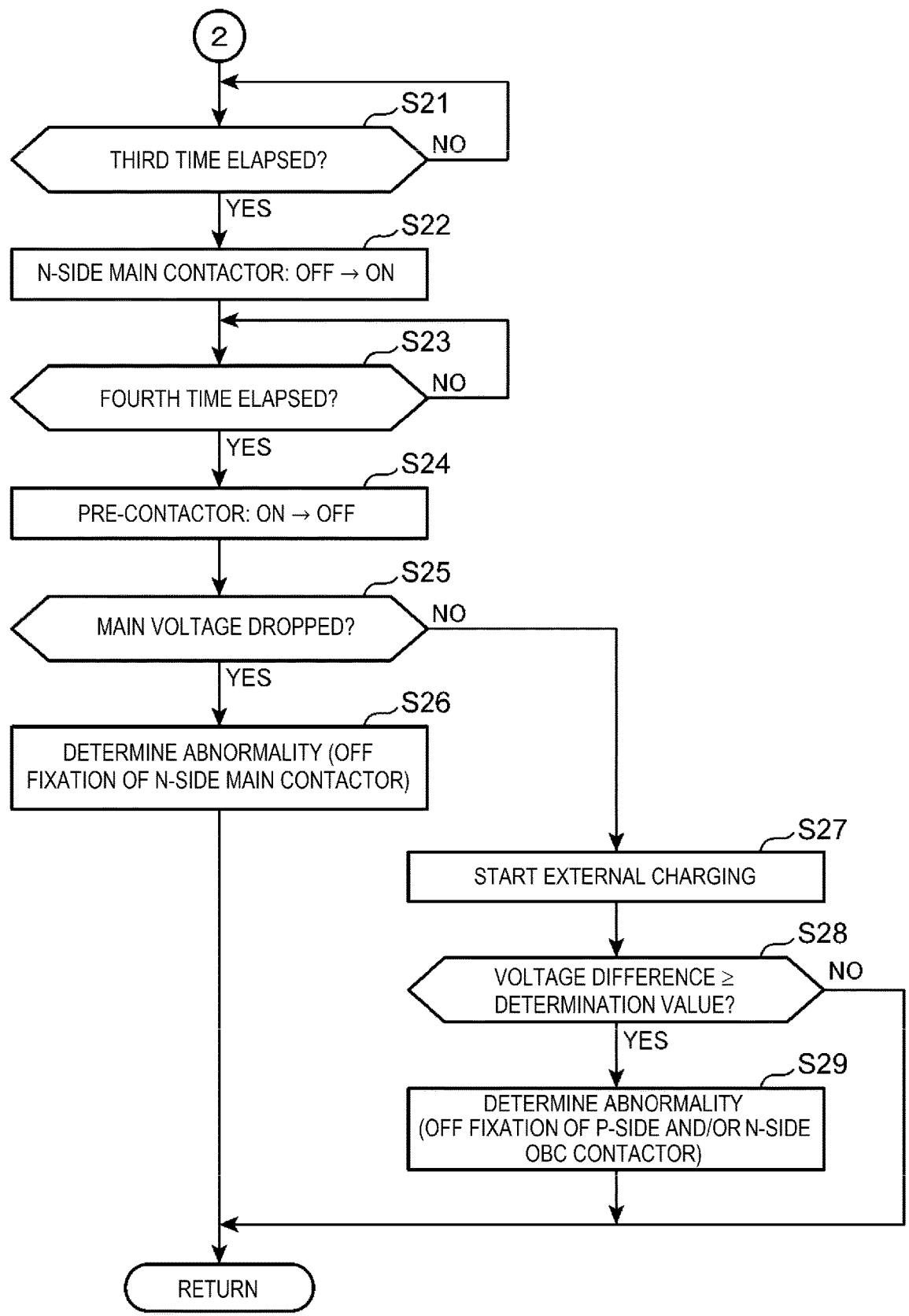
FIG. 6 is a flowchart illustrating a subsequent part of the procedure illustrated in FIG. 5.
Figure 7:
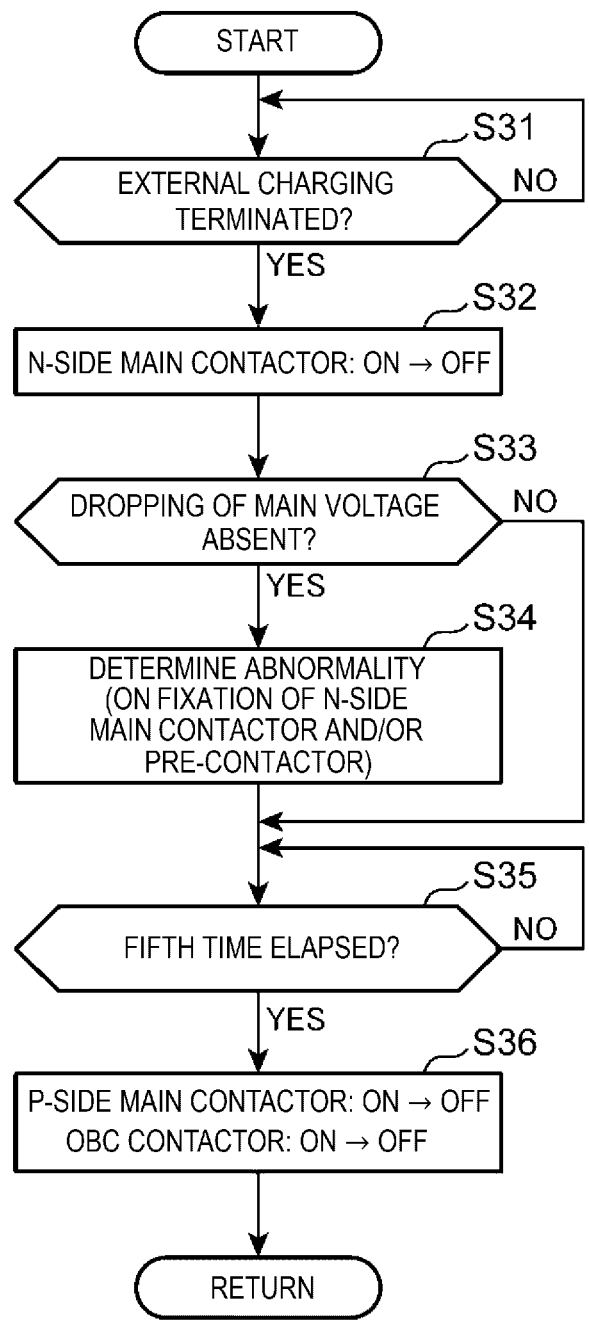
FIG. 7 is a flowchart illustrating a procedure of the contactor failure determination that is executed when external charging is terminated.
Figure 9:
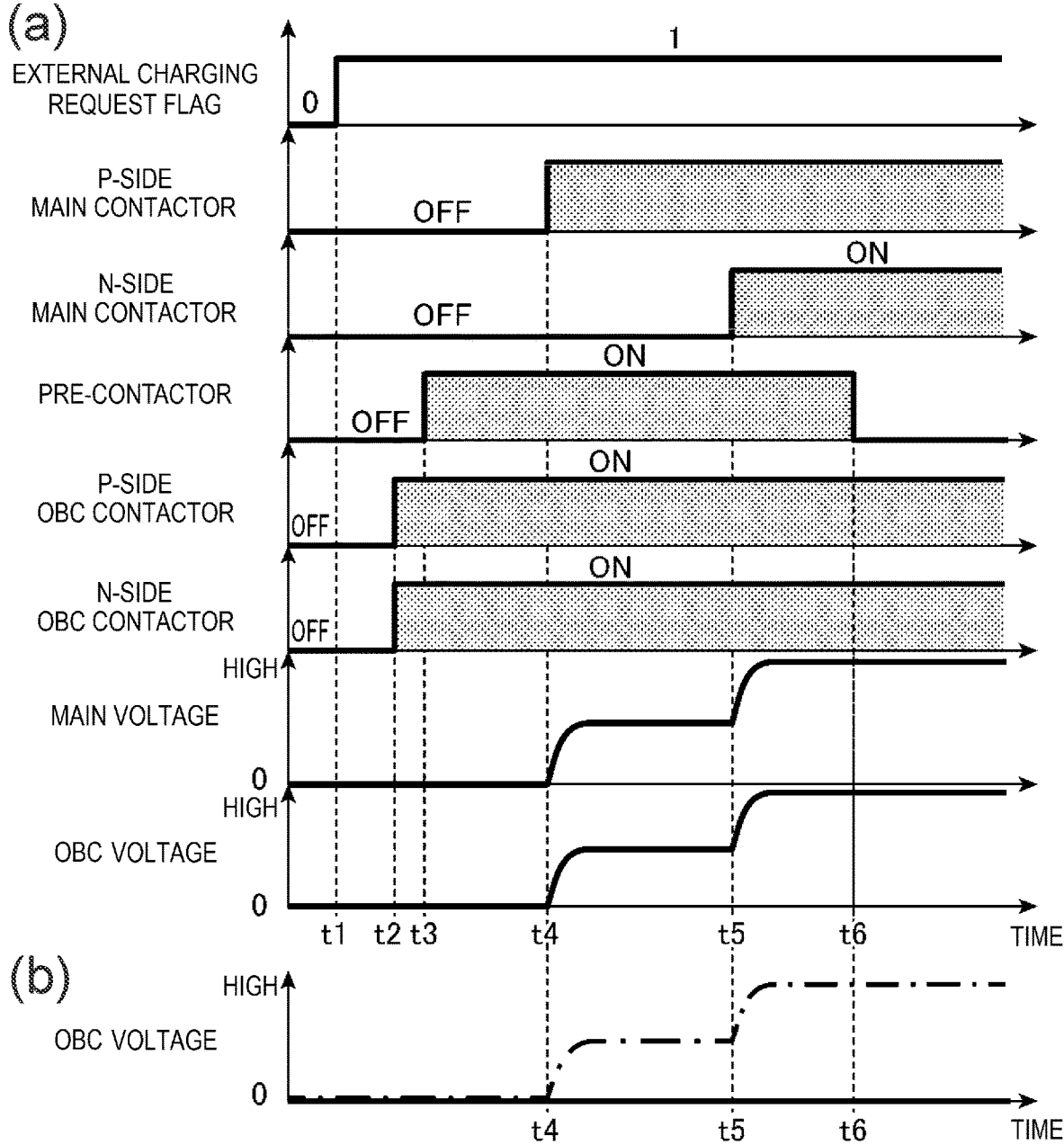
Figure 10:
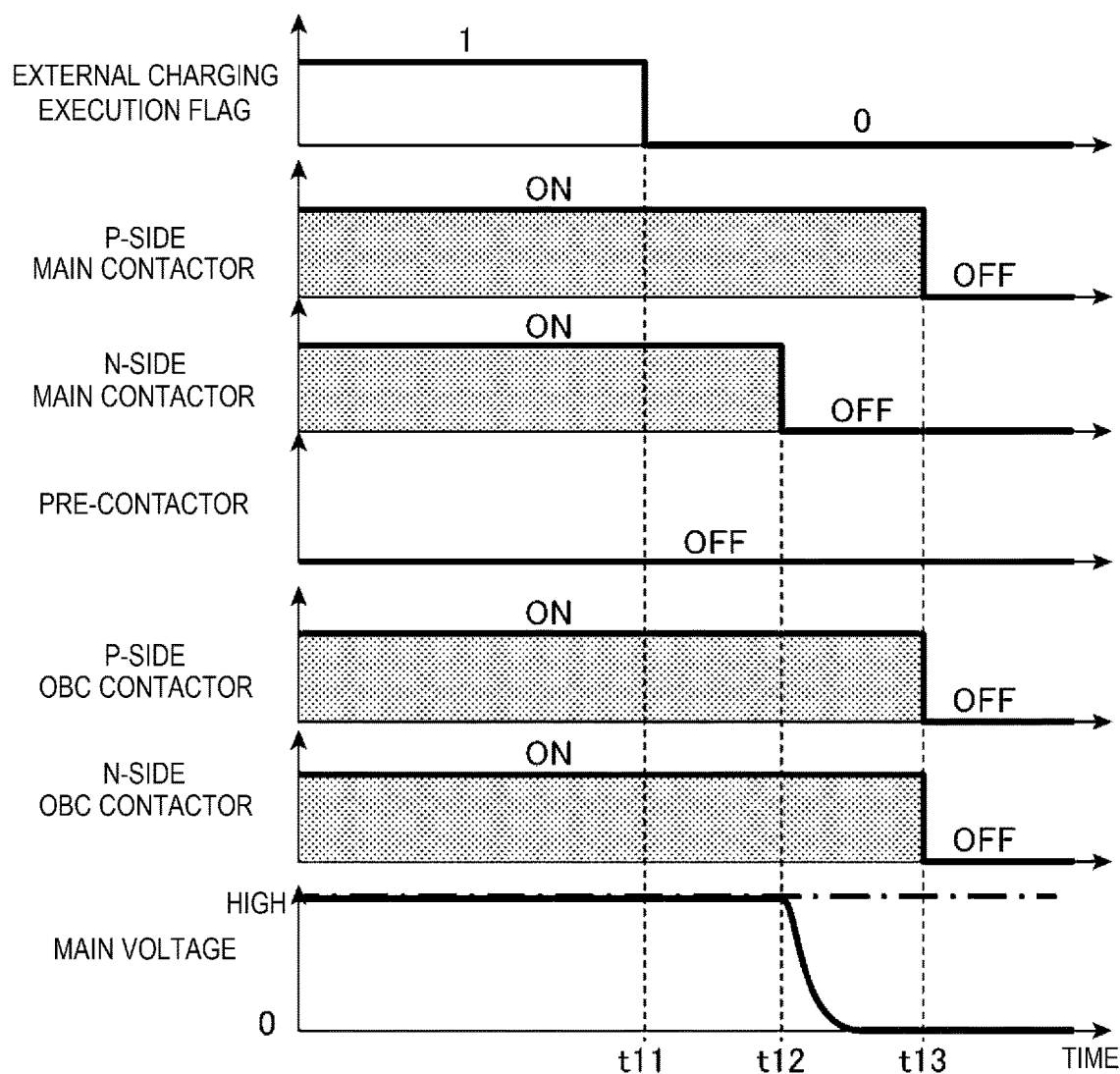
FIG. 10 is a chart illustrating the time changes in the parameters at the time when the external charging is terminated.

FIG. 4 to FIG. 6 are flowcharts illustrating a procedure for the contactor failure determination that is executed during the external charging request time. FIG. 7 is a flowchart illustrating a procedure for the contactor failure determination that is executed when the external charging is terminated. FIGS. 8 and 9 include graphs illustrating a time change in each parameter during the external charging request time. FIG. 10 is a graph illustrating the time change in each of the parameters when the external charging is terminated. Hereinafter, the closed state of the contactor will appropriately be referred to as ON, and the open state thereof will appropriately be referred to as OFF. In addition, failure of the contactor in the closed state will be referred to as ON fixation, and failure thereof in the open state will be referred to as OFF fixation.

In FIG. 8, (a) sequentially illustrates, from the top, an external charging request flag, commands from the PCM 201 to contactors including the P-side main contactor 71, the N-side main contactor 72, the pre-contactor 73, the P-side OBC contactor 81, and N-side OBC contactor 82, the main voltage, and the OBC voltage. The external charging request flag is a flag that is switched from 0 to 1 when the external charging request is made and that is switched from 1 to 0 when the external charging stop request is made.

A graph of the main voltage at (a) of FIG. 8 is a graph in the case where none of the contactors fail. A graph (a solid line) at (b) of FIG. 8 is a graph of the main voltage in the case where step S6 in the failure determination, which will be described below, is executed and the ON fixation of the P-side main contactor 71 is determined. A graph (a solid line) at (c) of FIG. 8 is a graph of the main voltage in the case where step S14 in the failure determination, which will be described below, is executed and the OFF fixation of at least one of the P-side main contactor 71 and the pre-contactor 73 is determined. A graph (a solid line) at (d) of FIG. 8 is a graph of the main voltage in the case where step S26 in the failure determination, which will be described below, is executed and the OFF fixation of the N-side main contactor 72 is determined. In FIG. 8, (b) and (c) illustrate a part of the main voltage in (a) with a chain line.

FIG. 9 at (a) includes the same graphs as those in FIG. 8 at (a). Meanwhile, a graph (a solid line) at (b) of FIG. 9 is a graph of the OBC voltage in the case where step S16 in the failure determination, which will be described below, is executed and the OFF fixation of at least one of the OBC contactors 81, 82 is determined. In FIG. 9, (b) illustrates the OBC voltage in (a) with a chain line.

FIG. 10 illustrates an external charging execution flag, the commands from the PCM 201 to contactors including the P-side main contactor 71, the N-side main contactor 72, the pre-contactor 73, the P-side OBC contactor 81, and N-side OBC contactor 82, and the main voltage. The external charging execution flag is a flag that is switched from 0 to 1 when the external charging is started and that is switched from 1 to 0 when the external charging is terminated. In the graph of the main voltage in FIG. 10, a solid line is a graph in the case where none of the contactors fail, and a chain line is a graph in the case where step S34, which will be described below, is executed and the ON fixation of at least one of the N-side main contactor 72 and the pre-contactor 73 is determined.

(Failure Determination Processing During External Charging Request)

The flowchart in FIG. 4 is started in a state where the vehicle is stopped and the command of OFF is output from the PCM 201 to each of the contactors.

First, the PCM 201 determines whether the external charging request is made (whether the AC connector fitting signal is received) (step S1). In the example illustrated in FIGS. 8 and 9, at time t1, the external charging request is made, and the external charging execution flag is switched from 0 to 1.

If it is determined YES in step S1 (if it is determined that the external charging request has been made), the PCM 201 starts the external charging preparation control. More specifically, first, the PCM 201 switches the commands to both of the OBC contactors 81, 82 from OFF to ON (step S2). In the example illustrated in FIGS. 8 and 9, at time t2, the command to each of the OBC contactors 81, 82 is switched to ON.

Next, the PCM 201 waits for a specified first time to elapse after step S2 (waits until a determination in step S3 becomes YES), and then switches the command to the pre-contactor 73 from OFF to ON (step S4). In the example illustrated in FIGS. 8 and 9, at time t3, the command to the pre-contactor 73 is switched to ON.

The command that is output from the PCM 201 to the P-side main contactor 71 during execution of step S4 is OFF. Accordingly, as long as the P-side main contactor 71 is normal, the high-voltage battery 2 and the high-voltage circuit 30 are maintained in an electrically interrupted state even when the pre-contactor 73 is turned ON in step S4. For this reason, in this case, as illustrated in FIG. 8 at (a), the main voltage is maintained near zero even after the time t3 (after execution of step S4). On the other hand, in the case where the P-side main contactor 71 is fixed to be ON (i.e., stuck in an ON state), the electrical connection between the high-voltage battery 2 and the high-voltage circuit 30 is established when the pre-contactor 73 is turned ON in step S4. As a result, in this case, as illustrated in FIG. 8 at (b), the main voltage rises (increases) after the time t3 (after execution of step S4).

Thus, after execution of step S4, the PCM 201 determines whether the main voltage has risen (increased) (step S5). If this determination is YES, and the main voltage has been risen, the PCM 201 determines that the P-side main contactor 71 is fixed to be ON (step S6). In addition, the PCM 201 notifies an occupant of abnormality by causing the HMI device 208 to provide a display for notifying the abnormality, or the like. Thereafter, the PCM 201 terminates the failure determination. If the processing proceeds to step S6, the external charging preparation control is also stopped.

On the other hand, if it is determined NO in step S5, and the main voltage has not risen (increased), the processing proceeds to step S11 in FIG. 5. In step S11, the PCM 201 determines whether a specified second time has elapsed since the execution of step S4. Then, the PCM 201 waits for this determination to become YES (waits until the second time elapses since execution of step S4), and then executes step S12. In step S12, the PCM 201 switches the command to the P-side main contactor 71 from OFF to ON. In the example illustrated in FIGS. 8 and 9a, at time t4, the command to the P-side main contactor 71 is switched to ON.

As long as neither the pre-contactor 73 nor the P-side main contactor 71 is fixed to be OFF, both of the pre-contactor 73 and the P-side main contactor 71 are turned ON in step S12. Thus, the electrical connection between the high-voltage circuit 30 and the high-voltage battery 2 is established. Accordingly, in this case, as illustrated in FIG. 8 at (a), the main voltage rises after the time t4 (after execution of step S12). On the other hand, in the case where at least one of the pre-contactor 73 and the P-side main contactor 71 is fixed to be OFF, the high-voltage circuit 30 and the high-voltage battery 2 are maintained in the electrically interrupted state even after execution of step S12. For this reason, in this case, as illustrated in FIG. 8 at (c), the main voltage does not change before and after the time t4 (before and after execution of step S12) and is maintained near zero.

Thus, after execution of step S12, the PCM 201 determines whether rising of (the increase in) the main voltage is absent (step S13). If this determination is YES, and rising of the main voltage is absent, the PCM 201 determines that at least one of the pre-contactor 73 and the P-side main contactor 71 is fixed to be OFF (step S14). In addition, the PCM 201 notifies the occupant of the abnormality by causing the HMI device 208 to provide the display for notifying the abnormality, or the like. Thereafter, the PCM 201 terminates the failure determination. If the processing proceeds to step S14, the external charging preparation control is also stopped.

The command that is output from the PCM 201 to each of the OBC contactors 81, 82 during execution of step S12 is ON. Thus, in the case where these OBC contactors 81, 82 are normal, the high-voltage circuit 30 and the OBC circuit 40 are electrically connected. For this reason, in the case where the OBC contactors 81, 82 are normal, the high-voltage battery 2 and the OBC circuit 40 are electrically connected when the determination in step S13 is NO and the main voltage has risen due to execution of step S12, that is, when the high-voltage circuit 30 and the high-voltage battery 2 are electrically connected due to execution of step S12. Accordingly, in this case, as illustrated in FIG. 9 at (a), the OBC voltage rises (increases) after the time t4 (after execution of step S12). On the other hand, in the case where at least one or both of the OBC contactors 81, 82 are fixed to be OFF, the high-voltage circuit 30 and the OBC circuit 40, and thus, the OBC circuit 40 and the high-voltage battery 2 are not electrically connected. For this reason, in this case, as illustrated in FIG. 9 at (b), the OBC voltage is maintained near zero even after the time t4 (after execution of step S12).

From the above, if it is determined NO in step S13, and the main voltage has risen after execution of step S12, that is, when the high-voltage circuit 30 and the high-voltage battery 2 are electrically connected due to execution of step S12, the processing proceeds to step S15, and the PCM 201 determines whether rising of (the increase in) the OBC voltage is absent after execution of step S12. If this determination is YES, and rising of (the increase in) the OBC voltage is absent, the PCM 201 determines that at least one of the P-side OBC contactor 81 and the N-side OBC contactor 82 is fixed to be OFF (step S16). In addition, the PCM 201 notifies the occupant of the abnormality by causing the HMI device 208 to provide the display for notifying the abnormality, or the like. If the processing proceeds to step S16, the external charging preparation control is also stopped.

If it is determined NO in step S15, and the OBC voltage has risen after execution of step S12, the processing proceeds to step S21 in FIG. 6. In step S21, the PCM 201 determines whether a specified third time has elapsed since execution of step S12. Then, the PCM 201 waits for this determination to become YES (waits until the third time elapses after execution of step S12), and then switches the command to the N-side main contactor 72 from OFF to ON (step S22). In the example illustrated in FIGS. 8 and 9, at time t5, the command to the N-side main contactor 72 is switched to ON. Next, the PCM 201 waits for a specified fourth time to elapse after execution of step S22 (waits until a determination in step S23 becomes YES), and then switches the command to the pre-contactor 73 from ON to OFF (step S24). In the example illustrated in FIGS. 8 and 9, at time t6, the command to the pre-contactor 73 is switched to OFF. Here, by executing step S24, the contactors are brought into a state where the main contactors 71, 72 and the OBC contactors 81, 82 are ON (closed) while the pre-contactor 73 is OFF (opened). In this way, by executing step S24, the external charging preparation control is terminated.

At the time point of executing step S24, the commands output from the PCM 201 to the P-side main contactor 71 and the N-side main contactor 72 are ON. Thus, as long as the N-side main contactor 72 is normal, the electricity between the high-voltage battery 2 and the high-voltage circuit 30 during execution of step S24 flows through the N-side main contactor 72 instead of the pre-contactor 73. For this reason, as long as the N-side main contactor 72 is normal, a current path is not changed even when step S24 is executed and the command to the pre-contactor 73 is switched to OFF. Then, as illustrated FIG. 8 at (a), the main voltage does not drop (decease) even after the time t6 (after execution of step S24). On the other hand, in the case where the N-side main contactor 72 is fixed to be OFF, the electricity between the high-voltage battery 2 and the high-voltage circuit 30 at timing immediately before execution of step S24 flows through the pre-contactor 73 instead of the N-side main contactor 72. Accordingly, in this case, when the command to the pre-contactor 73 is switched to OFF in step S24, the high-voltage battery 2 and the high-voltage circuit 30 are electrically interrupted. As illustrated in FIG. 8 at (d), the main voltage drops (decreases) after the time t6 (after execution of step S24).

Thus, after execution of step S24, the PCM 201 determines whether the main voltage has dropped (decreased) (step S25). If this determination is YES, and the main voltage has dropped (decreased), the PCM 201 determines that the N-side main contactor 72 is fixed to be OFF (step S26). In addition, the PCM 201 notifies the occupant of the abnormality by causing the HMI device 208 to provide the display for notifying the abnormality, or the like. Thereafter, the PCM 201 terminates the failure determination.

On the other hand, if it is determined NO in step S25, and the main voltage does not drop after execution of step S24, the processing proceeds to step S27, and the PCM 201 starts the external charging. As described above, in this embodiment, the PCM 201 sends the power signal to the external power supply 300. Then, after the external power supply 300 receives this signal, the power supply from the external power supply 300 to the OBC circuit 40 and thus to the high-voltage battery 2 is started.

Here, there is a possibility that the OBC contactors 81, 82 are turned OFF after the external charging is started. In other words, there is a possibility that the OBC contactors 81, 82, which are not fixed to be OFF during execution of step S14, fail after execution of step S24 and are turned OFF. In the case where at least one of the OBC contactors 81, 82 is turned OFF after the start of the external charging, the OBC voltage becomes lower than the main voltage. In detail, the voltage of the high-voltage circuit 30 is maintained to the same high voltage as that of the high-voltage battery 2 by maintaining the electrical connection between the high-voltage circuit 30 and the high-voltage battery 2. Meanwhile, in the case where at least one of the OBC contactors 81, 82 is turned OFF, the electrical connection between the OBC circuit 40 and the high-voltage battery 2 is interrupted. As a result, the OBC voltage becomes lower than the main voltage. However, the AC/DC converter 43 including a capacitor is provided in the OBC circuit 40 as described above, and the AC/DC converter 43 after the start of the external charging stores electric charges. Thus, even in the case where at least one of the OBC contactors 81, 82 is fixed to be OFF, the voltage of the OBC circuit 40 becomes a higher value than zero after the start of the external charging.

For this reason, after the external charging is started, the PCM 201 determines whether a voltage difference between the main voltage and the OBC voltage (in detail, an insufficient amount of the OBC voltage with respect to the main voltage and a value obtained by subtracting the OBC voltage from the main voltage) is equal to or larger than a specified determination value (step S28). If this determination is YES, and the voltage difference is larger than the determination value, that is, in the case where the OBC voltage is lower than the main voltage by the determination value or more, the PCM 201 determines that at least one of the OBC contactors 81, 82 is fixed to be OFF (step S29). In addition, the PCM 201 notifies the occupant of the abnormality by causing the HMI device 208 to provide the display for notifying the abnormality, or the like. Thereafter, the PCM 201 terminates the failure determination. On the other hand, if it is determined NO in step S28, and the voltage difference is smaller than the specified determination value, the PCM 201 terminates the failure determination as is. The determination value is set as a larger value than zero in advance, and is stored in the PCM 201.

Here, in this embodiment, the first to fourth times described above are set as follows. More specifically, the first time (the time t2 to the time t3) is set as a shorter time than the second time (the time t3 to the time t4). The second time (the time t3 to the time t4) is set as the shorter time than the third time (the time t4 to the time t5). The third time (the time t4 to the time t5) is set as the longer time than the fourth time (the time t5 to the time t6). The fourth time (the time t5 to the time t6) is set as the longer time than the first time (the time t2 to the time t3). The duration of each of the times is not limited to the above. However, when the duration of each of the times is set as described above, it is possible to appropriately detect the change in the voltage associated with opening/closing of each of the contactors, to further appropriately determine the failure of the contactor, and to reduce a time required for the failure determination.

(Failure Determination Processing During Termination of External Charging)

The flowchart in FIG. 7 is executed in the following state. The external charging is performed, the ON command is output from the PCM 201 to each of the main contactors 71, 72 and the OBC contactors 81, 82, and the OFF command is output from the PCM 201 to the pre-contactor 73.

First, the PCM 201 determines whether the external charging stop request is made, that is, whether the external charging is terminated (step S31). As described above, this determination is made on the basis of the AC connector fitting signal or the like. In the example illustrated in FIG. 10, at time t11, the external charging is terminated.

If the external charging is terminated, and it is determined YES in step S31, the PCM 201 switches the command to the N-side main contactor 72 from ON to OFF (step S32). In the example illustrated in FIG. 10, at time t12, the command to the N-side main contactor 72 is switched to OFF. Once the external charging is terminated, the power supply from the external AC power supply 300 to the vehicle side (the OBC circuit 40, the high-voltage circuit 30, and the high-voltage battery 2) is stopped onward.

The electrical connection among the OBC circuit 40, the high-voltage circuit 30, and the high-voltage battery 2 is maintained until just before execution of step S32. At a time point of executing step S32, the P-side main contactor 71 remains ON. Accordingly, in the case where the N-side main contactor 72 is normally switched to OFF, or in the case where the pre-contactor 73 is normally OFF, the high-voltage battery 2 and the high-voltage circuit 30 are electrically interrupted by switching the command to the N-side main contactor 72 to OFF. In conjunction therewith, the electrical connection between the high-voltage battery 2 and the OBC circuit 40 is also interrupted. Thus, in this case, as indicated by a solid line in FIG. 10, the main voltage drops (decreases) after the time t12, at which step S32 is executed. On the other hand, in the case where the N-side main contactor 72 or the pre-contactor 73 is fixed to be ON, the electrical connection between the high-voltage battery 2 and the high-voltage circuit 30 is maintained even when the command to the N-side main contactor 72 is switched to OFF. Thus, in this case, as indicated by a chain line in FIG. 10, the main voltage does not drop (decrease) even after the time t12, at which step S32 is executed.

For this reason, after execution of step S32, the PCM 201 determines whether dropping of (the decrease in) the main voltage is absent (step S33). If it is determined YES in step S33, and dropping of (the decrease in) the main voltage is absent after execution of step S32, the PCM 201 determines that at least one of the N-side main contactor 72 and the pre-contactor 73 is fixed to be ON (step S34). In addition, the PCM 201 notifies the occupant of the abnormality by causing the HMI device 208 to provide the display for notifying the abnormality, or the like.

After execution of step S34 or if it is determined NO in step S33 and the main voltage has dropped after execution of step S32, the processing proceeds to step S35, and the PCM 201 determines whether a specified fifth time has elapsed after execution of step S32. Then, the PCM 201 waits until the determination in step S35 becomes YES (waits for the specified fifth time to elapse after step S32), switches the commands to the P-side main contactor 71 and the OBC contactors 81, 82 from ON to OFF (step S36), and terminates the failure determination processing (see t13 in FIG. 10). Although the illustration and the like are not provided, in this embodiment, after above step S32, the PCM 201 also executes discharging processing of the high-voltage circuit 30.

Here, the above step S2 is an example of a "first control" in the present disclosure, the above step S4 is an example of a "second control" in the present disclosure, and the above step S12 is an example of a "third control" in present disclosure. In addition, the above step S22 is an example of a "fourth control" in the present disclosure, and the above step S23 is an example of a "fifth control" in the present disclosure. The above step S32 is an example of a "sixth control" in the present disclosure.

(Operational Effects and the Like)

As it has been described so far, in the above embodiment, when the external charging request is made, the contactor failure determination is made by using the execution timing of the external charging preparation control for bringing the contactors into the state where the main contactors 71, 72 and the OBC contactors 81, 82 are ON and the pre-contactor 73 is OFF and for electrically connecting the OBC circuit 40 and the high-voltage battery 2. Accordingly, there is no need to separately open/close the contactors for the contactor failure determination. Thus, it is possible to suppress electric power consumption for opening/closing the contactors and to prevent generation of noise that is associated with opening/closing of the contactors at unexpected timing by a user. In addition, in the above embodiment, during execution of the external charging preparation control, steps S2, S4, and S12 are sequentially executed, and the OBC contactors 81, 82, the pre-contactor 73, and the P-side main contactor 71 are turned ON in this order. Accordingly, it is possible to avoid generation of a loud noise that is associated with turning ON of the multiple contactors at the same time. Therefore, it is possible to prevent the occupant from feeling a sense of discomfort at the start of the vehicle 1. Furthermore, in the above embodiment, while these four contactors are prevented from being turned ON at the same time, the two OBC contactors 81, 82 are turned on at the same time. Accordingly, it is possible to reduce the time required to turn ON these OBC contactors 81, 82 while the noise is suppressed to be low. Thus, it is possible to reduce the time required for the external charging preparation control and the failure determination. For this reason, it is possible to reduce the time until the start of the external charging after these control and determination since the external charging request is made, and it is thus possible to start the external charging promptly.

Steps S4, S12 are executed before execution of step S22, and the P-side main contactor 71 is turned on in the state where the pre-contactor 73 is ON and the N-side main contactor 72 is OFF. That is, the positive electrode terminal 2a of the high-voltage battery 2 and the high-voltage circuit 30 are electrically connected in the state where the negative electrode terminal 2b of the high-voltage battery 2 and the high-voltage circuit 30 are connected via the pre-contactor 73 with the high electrical resistance. Thus, it is possible to prevent the high in-rush current from flowing from the high-voltage battery 2 to the high-voltage circuit 30 when the high-voltage battery 2 and the high-voltage circuit 30 are electrically connected, and thus to prevent failure of the electrical devices provided in the high-voltage circuit 30. In addition, in the case where the high-voltage circuit 30 and the OBC circuit 40 are electrically connected, it is also possible to prevent the above in-rush current from flowing into the OBC circuit 40 and thus to prevent the failure of the OBC 41.

In the above embodiment, when at least one of the OBC contactors 81, 82 is fixed to be OFF, the determination in step S15 is made by using the fact that the OBC voltage has not risen after execution of step S12 (after the command to the P-side main contactor 71 is switched to ON). Then, in the case where the OBC voltage has not risen after execution of step S12, it is determined that at least one of the OBC contactors 81, 82 is fixed to be OFF. Therefore, it is possible to appropriately determine whether the OBC contactors 81, 82 are fixed to be OFF, that is, whether the OBC contactors 81, 82 fail in the closed state.

In the above embodiment, when the P-side main contactor 71 is fixed to be ON, the determination in step S5 is made by using the fact that the main voltage has risen after execution of step S4 (after the command to the pre-contactor 73 is switched to ON). Then, in the case where the main voltage has risen after execution of step S4, it is determined that the P-side main contactor 71 is fixed to be ON. Therefore, it is possible to appropriately determine whether the P-side main contactor 71 is fixed to be ON.

In the above embodiment, when at least one of the P-side main contactor 71 and the pre-contactor 73 is fixed to be OFF, the determination in step S13 is made by using the fact that rising of the main voltage is absent after execution of step S12 (after the command to the P-side main contactor 71 is switched to ON). Then, in the case where rising of the main voltage is absent after execution of step S12, it is determined that at least one of the P-side main contactor 71 and the pre-contactor 73 is fixed to be OFF. Therefore, it is possible to appropriately determine the failure of the P-side main contactor 71 and the pre-contactor 73.

In the above embodiment, when the N-side main contactor 72 is fixed to be OFF, the determination in step S25 is made by using the fact that the main voltage has dropped after execution of step S24 (after the command to the pre-contactor 73 is switched to OFF). Then, in the case where the main voltage has dropped after execution of step S24, it is determined that the N-side main contactor 72 is fixed to be OFF. Therefore, it is possible to appropriately determine whether the N-side main contactor 72 is fixed to be OFF.

In the above embodiment, when at least one of the OBC contactors 81, 82 is fixed to be OFF, the determination in step S28 is made by using the fact that the value of the OBC voltage becomes lower than that of the main voltage after the start of the external charging. Then, in the case where the voltage difference therebetween after the start of the external charging is equal to or larger than the determination value, it is determined that at least one of the OBC contactors 81, 82 is fixed to be OFF. Therefore, it is possible to appropriately determine the failure of these OBC contactors 81, 82.

In the above embodiment, after the termination of the external charging, the failure determination is made by using the timing for closing each of the contactors 71, 72, 73, 81, 82. Thus, it is possible to secure an opportunity of the failure determination of these. In addition, when at least one of the N-side main contactor 72 and the pre-contactor 73 is fixed to be ON, the determination in step S33 is made by using the fact that dropping of the main voltage is absent after execution of step S32 (after the command to the N-side main contactor 72 is switched to OFF). Then, in the case where dropping of the main voltage is absent after execution of step S32, it is determined that at least one of the N-side main contactor 72 and the pre-contactor 73 is fixed to be ON. Therefore, it is possible to appropriately determine the failure of the N-side main contactor 72 and the pre-contactor 73.

Modified Embodiments

In the above embodiment, the description has been made on the case where the main voltage sensor SN1 for detecting the voltage of the high-voltage circuit 30 is provided to the DC/DC converter 8. However, the location where the main voltage sensor SN1 is provided is not limited thereto. In addition, the sensor for detecting the rising and dropping of the voltage of the high-voltage circuit 30 is not limited thereto. For example, the rising and dropping of the voltage of the high-voltage circuit 30 may be detected by using a current sensor or the like. Similarly, instead of the OBC voltage sensor SN2, the current sensor or the like may be used to detect the rising and dropping of the voltage of the OBC circuit 40.

In the above embodiment, the description has been made on the case where the pre-contactor 73 is disposed in parallel with the N-side main contactor 72. However, the pre-contactor 73 may be disposed in parallel with the P-side main contactor 71. In the case where the pre-contactor 73 is disposed in parallel with the P-side main contactor 71, in the above failure determination (the flowcharts in FIG. 4 to FIG. 7), the "P-side main contactor" and the "N-side main contactor" only need to be switched. In addition, the external charger may charge the high-voltage battery by using the electric power from the external DC power supply.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 High-voltage battery (battery)
2a Positive electrode terminal
2b Negative electrode terminal
3 Low-voltage battery
4 Motor
6 Inverter
30 High-voltage circuit (first circuit)
40 OBC circuit (second circuit)
41 OBC (external charger)
43 AC/DC converter
71 P-side main contactor (second main contactor, main contactor)
72 N-side main contactor (first main contactor, main contactor)
73 Pre-contactor (pre-charge contactor)
81 P-side OBC contactor (external charging contactor)
82 N-side OBC contactor (external charging contactor)
201 PCM (controller)
SN1 Main voltage sensor (second voltage sensor, third voltage sensor)
SN2 OBC voltage sensor (voltage sensor, third voltage sensor)

The invention claimed is:

1. A contactor failure determination apparatus mounted to a vehicle including a battery that includes a positive electrode terminal and a negative electrode terminal, a first circuit that includes an inverter and a motor, a first main contactor that makes or interrupts electrical connection between the first circuit and one of the positive electrode terminal and the negative electrode terminal, a second main contactor that makes or interrupts electrical connection between the first circuit and the other of the positive electrode terminal and the negative electrode terminal, and a pre-charge contactor that is disposed in parallel with the first main contactor and makes or interrupts the electrical connection between the first circuit and the one terminal, the contactor failure determination apparatus comprising:
a second circuit that includes an external charger configured to supply electric power from an external power supply to the battery so as to charge the battery;
a pair of external charging contactors that make or interrupt electrical connection between negative-electrode sides of the first circuit and the second circuit and between positive-electrode sides of the first circuit and the second circuit;
a voltage sensor configured to detect rising or dropping of a voltage of the second circuit; and
a controller that executes an external charging preparation control for opening the first main contactor, the second main contactor, the pre-charge contactor, and each of the external charging contactors after a stop of the vehicle, and in response to a request to start external charging for charging the battery by the external power supply being made, bringing the contactors into a state where each of the main contactors and each of the external charging contactors are closed and the pre-charge contactor is opened before a start of power supply from the external power supply to the external charger, wherein electrical resistance between the terminal and the first circuit via the pre-charge contactor is set to be higher than electrical resistance between the terminal and the first circuit via the first main contactor, when executing the external charging preparation control, the controller executes a first control for closing each of the external charging contactors, executes a second control for closing the pre-charge contactor after execution of the first control, executes a third control for closing the second main contactor after execution of the second control, and in response to the voltage sensor detecting that the voltage of the second circuit has not risen after execution of the third control, determines that at least one of the external charging contactors has failed in an open state, and the controller closes the external charging contactors simultaneously, then the pre-charge contactor, and then the second main contactor in this order.

2. The contactor failure determination apparatus for a vehicle according to claim 1, further comprising:

a second voltage sensor configured to detect rising or dropping of a voltage of the first circuit, wherein in response to the second voltage sensor detecting that the voltage of the first circuit has risen after execution of the second control, the controller determines that the second main contactor has failed in a closed state.

3. The contactor failure determination apparatus for a vehicle according to claim 2, wherein in response to the second voltage sensor detecting that the voltage of the first circuit has not risen after execution of the third control, the controller determines that at least one of the pre-charge contactor and the second main contactor has failed in an open state.

4. The contactor failure determination apparatus for a vehicle according to claim 3, further comprising:

a third voltage sensor configured to detect a voltage difference between the first circuit and the second circuit, wherein in response to the third voltage sensor detecting that the voltage of the second circuit is lower than the voltage of the first circuit by a specified determination value or more after the start of the external charging, the controller determines that at least one of the external charging contactors has failed in the open state.

5. The contactor failure determination apparatus for a vehicle according to claim 4, wherein after the external charging is terminated, the controller executes a sixth control for opening the first main contactor, and in response to the second voltage sensor detecting that the voltage of the first circuit has not dropped after execution of the sixth control, determines that at least one of the first main contactor and the pre-charge contactor has failed in a closed state.

6. The contactor failure determination apparatus for a vehicle according to claim 5, wherein the external charger has an AC/DC converter that converts an AC current to a DC current, converts the AC current of an external AC power supply to the DC current, and supplies the DC current to the battery.

7. The contactor failure determination apparatus for a vehicle according to claim 6, wherein the time from execution of the first control to execution of the second control is set to be shorter than the time from execution of the second control to execution of the third control.

8. The contactor failure determination apparatus for a vehicle according to claim 3, further comprising:

a third voltage sensor configured to detect a voltage difference between the first circuit and the second circuit, wherein in response to the third voltage sensor detecting that a voltage of the second circuit is lower than a voltage of the first circuit by a specified determination value or more after the start of the external charging, the controller determines that at least one of the external charging contactors has failed in the open state.

9. The contactor failure determination apparatus for a vehicle according to claim 1, wherein during execution of the external charging preparation control, the controller:

executes a fourth control for closing the first main contactor after execution of the third control, executes a fifth control for opening the pre-charge contactor after execution of the fourth control, and in response to a second voltage sensor detecting that a voltage of the first circuit has dropped after execution of the fifth control, determines that the first main contactor has failed in an open state.

10. The contactor failure determination apparatus for a vehicle according to claim 9, wherein a time from execution of the second control to execution of the third control is set to be shorter than a time from execution of the third control to execution of the fourth control.

11. The contactor failure determination apparatus for a vehicle according to claim 10, wherein the time from execution of the third control to execution of the fourth control is set to be longer than a time from execution of the fourth control to execution of the fifth control.

12. The contactor failure determination apparatus for a vehicle according to claim 11, wherein the time from execution of the fourth control to execution of the fifth control is set to be longer than the time from execution of the first control to execution of the second control.

13. The contactor failure determination apparatus for a vehicle according to claim 1, wherein in response to a second voltage sensor detecting that a voltage of the first circuit has not risen after execution of the third control, the controller determines that at least one of the pre-charge contactor and the second main contactor has failed in an open state.

14. The contactor failure determination apparatus for a vehicle according to claim 1, wherein after the external charging is terminated, the controller executes a sixth control for opening the first main contactor and in response to a second voltage sensor detecting that a voltage of the first circuit has not dropped after execution of the sixth control, determines that at least one of the first main contactor and the pre-charge contactor has failed in a closed state.

15. The contactor failure determination apparatus for a vehicle according to claim 1, wherein the external charger has an AC/DC converter that converts an AC current to a DC current, converts the AC current of an external AC power supply to the DC current, and supplies the DC current to the battery.

16. The contactor failure determination apparatus for a vehicle according to claim 1, wherein the time from execution of the first control to execution of the second control is set to be shorter than the time from execution of the second control to execution of the third control.

* * * * *